United States Patent
Macpherson

(10) Patent No.: US 9,697,120 B2
(45) Date of Patent: Jul. 4, 2017

(54) EXECUTION USING MULTIPLE PAGE TABLES

(75) Inventor: Mike B. Macpherson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 13/997,642

(22) PCT Filed: May 9, 2012

(86) PCT No.: PCT/US2012/037164
§ 371 (c)(1),
(2), (4) Date: Dec. 4, 2013

(87) PCT Pub. No.: WO2013/169248
PCT Pub. Date: Nov. 14, 2013

(65) Prior Publication Data
US 2014/0082253 A1    Mar. 20, 2014

(51) Int. Cl.
*G06F 12/08* (2016.01)
*G06F 12/10* (2016.01)
(Continued)

(52) U.S. Cl.
CPC ............ *G06F 12/0802* (2013.01); *G06F 9/06* (2013.01); *G06F 9/30* (2013.01); *G06F 9/455* (2013.01);
(Continued)

(58) Field of Classification Search
None
See application file for complete search history.

(56) References Cited

U.S. PATENT DOCUMENTS 5,854,913 A      12/1998  Goetz et al.
6,480,952 B2 *   11/2002  Gorishek, IV ........ G06F 9/3879
                                                           703/26
(Continued)

FOREIGN PATENT DOCUMENTS

CN       CN1492323 A     4/2004
CN       CN101346706 A   1/2009

OTHER PUBLICATIONS

Office Action mailed Jun. 11, 2015 for Australian Application No. 2012379689, 5 pages.
(Continued)

*Primary Examiner* — Denise Tran
(74) *Attorney, Agent, or Firm* — Schwabe, Williamson & Wyatt, P.C.

(57) ABSTRACT

Embodiments of techniques and systems for execution of code with multiple page tables are described. In embodiments, a heterogenous system utilizing multiple processors may use multiple page tables to selectively execute appropriate ones of different versions of executable code. The system may be configured to support use of function pointers to virtual memory addresses. In embodiments, a virtual memory address may be mapped, such as during a code fetch. In embodiments, when a processor seeks to perform a code fetch using the function pointer, a page table associated with the processor may be used to translate the virtual memory address to a physical memory address where code executable by the processor may be found. Usage of multiple page tables may allow the system to support function pointers while utilizing only one virtual memory address for each function that is pointed to. Other embodiments may be described and claimed.

22 Claims, 6 Drawing Sheets

(51) Int. Cl.

| | | |
|---|---|---|
| *G06F 9/455* | (2006.01) | |
| *G06F 9/30* | (2006.01) | |
| *G06F 9/06* | (2006.01) | |
| *G06F 12/0802* | (2016.01) | |
| *G06F 12/1009* | (2016.01) | |
| *G06F 12/1036* | (2016.01) | |

(52) U.S. Cl.
CPC ...... *G06F 9/45533* (2013.01); *G06F 9/45554* (2013.01); *G06F 9/45558* (2013.01); *G06F 12/1009* (2013.01); *G06F 12/1036* (2013.01); *G06F 2009/45583* (2013.01); *G06F 2212/151* (2013.01)

(56) References Cited

U.S. PATENT DOCUMENTS

| | | |
|---|---|---|
| 7,167,970 B2 | 1/2007 | Jacobson et al. |
| 7,418,584 B1 | 8/2008 | Klaiber et al. |
| 8,156,307 B2 | 4/2012 | Wallach et al. |
| 2002/0029308 A1 | 3/2002 | Babaian et al. |
| 2009/0055596 A1* | 2/2009 | Wallach ............... G06F 9/3879 711/141 |
| 2009/0070553 A1 | 3/2009 | Wallach et al. |
| 2010/0122264 A1 | 5/2010 | Xiaocheng et al. |
| 2012/0089982 A1 | 4/2012 | Wang et al. |

OTHER PUBLICATIONS

International Preliminary Report on Patentability mailed Nov. 20, 2014 for International Application No. PCT/US2012/037164, 6 pages.
International Search Report and Written Opinion mailed Jan. 31, 2013 for International Application No. PCT/US2012/037164, 8 pages.
Extended European Search Report mailed Nov. 11, 2015 for European Application No. 12876530.2, 8 pages.
Office Action mailed Jun. 6, 2016 for Australian Application No. 2012379689, 2 pages.

* cited by examiner

Heterogenous Execution System with Multiple Page Tables

EXECUTION USING MULTIPLE PAGE TABLES

CROSS REFERENCE TO RELATED APPLICATIONS

The present application is a national phase entry under 35 U.S.C. §371 of International Application No. PCT/US2012/037164, filed May 9, 2012, entitled "EXECUTION USING MULTIPLE PAGE TABLES", which designated, among the various States, the United States of America. The Specification of the PCT/US2012/037164 Application is hereby incorporated by reference.

BACKGROUND

Heterogenous computing systems and devices (e.g., systems that use multiple distinct computing processors based on different instruction set architectures) are used in many computing scenarios. For example, in some devices, a separate CPU and CPU may be situated on the same die. In various systems, the computing processors may be configured to execute instructions based on non-identical instruction set architectures (ISAs). The use of heterogenous processors can provide processing, space, and resources efficiencies. For example, two processors that lie on the same die may each have access to a common memory; this shared memory allows the same data to be easy accessed by both processors.

However, resource sharing can also lead to problems in some heterogenous computing systems. One such problem comes when using program languages that support the use of function pointers, which allow a pointer to a function to be passed as data between threads. These function pointers are not frequently well supported (or supported at all) in traditional systems with heterogenous processors using different ISAs. For example, if a pointer is created to a function that is written in a first ISA for a first processor, that same pointer could end up being passed to a thread running on a second processor. If the second processor attempts to execute the function pointed to by the function pointer, there will usually be an error because the second processor will attempt to execute a function written in an unsupported ISA. Some systems attempt to deal with this by storing two pointers for each function, but this does not work well in all languages, such as, for example, C and C++.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may he made without departing from the scope of the present disclosure. Therefore, the following detailed description is not to be taken in a limiting sense, and the scope of embodiments is defined by the appended claims and their equivalents, Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
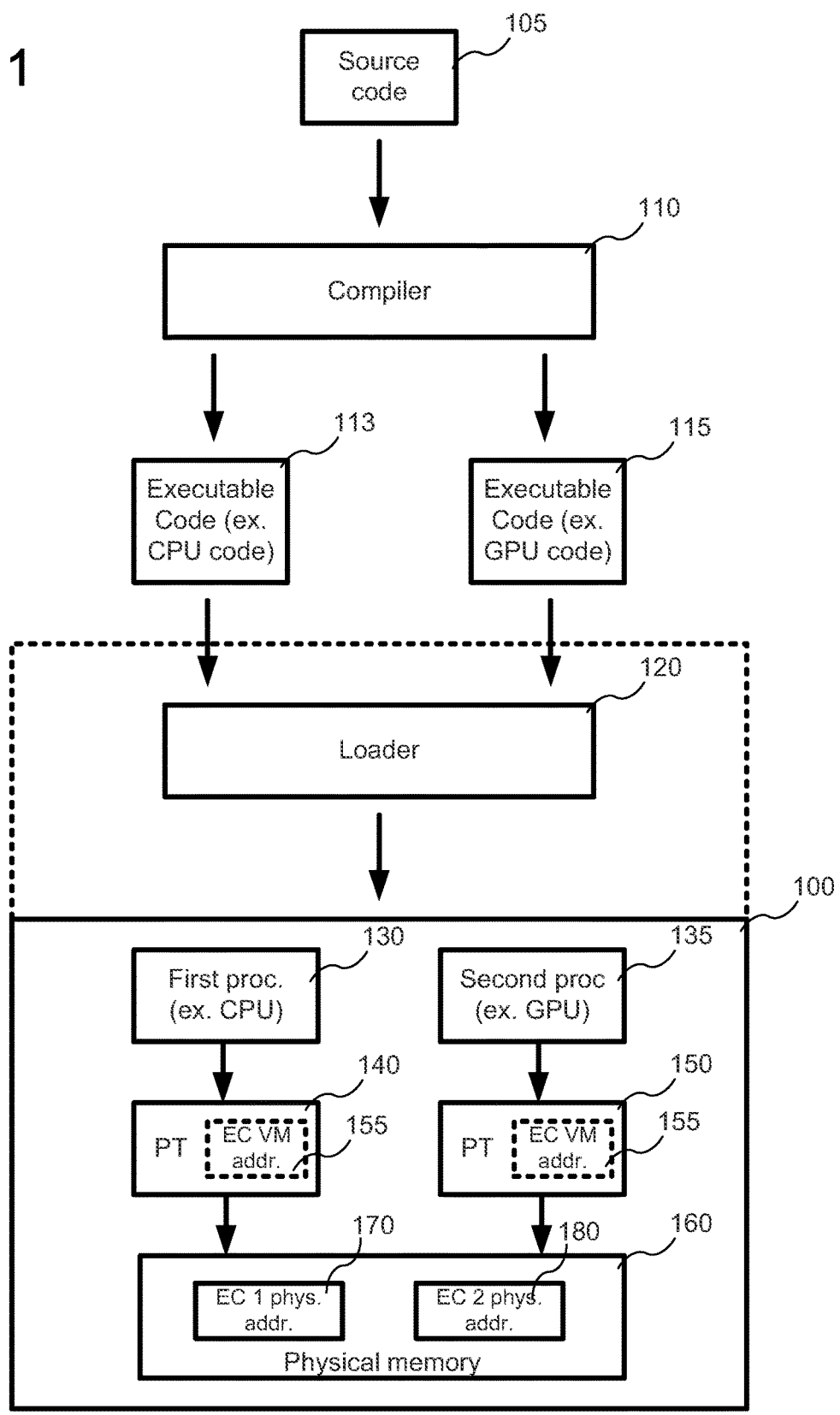
FIG. 1 illustrates an example heterogenous execution system with multiple page tables, in accordance with various embodiments.

Referring to FIG. 1, a block diagram is shown illustrating a heterogenous execution system with multiple page tables 100 ("HES 100"). In various embodiments, the HES 100 may be configured to selectively execute appropriate ones of different versions of executable code in the heterogenous processor environment. In various embodiments, the HES 100 may be configured to support use of function pointers to virtual memory addresses for executable code through the use of multiple page tables. Thus, in embodiments of the HES 100, a function pointer may include a virtual memory address that is mapped, such as by a one of the multiple page tables, to a physical memory address that contains executable code that is executable by the processor utilizing the function pointer. The mapping may be used during virtual memory address translations, such as during a code fetch. In embodiments, when another processor of the 100 seeks to perform its own code fetch using the function pointer, a second page table associated with the other processor may be used to translate the virtual memory address to a different physical memory address where code executable by the other processor may be found. This usage of multiple page tables allows the HES 100 to support function pointers while utilizing only one virtual memory address for each function that is pointed to.

As illustrated, in embodiments, a portion of source code 105 (e.g., a function) may be compiled by a compiler 110 into multiple versions of executable code (such as illustrated versions of executable code 113 and 115). In various embodiments, the compiler 110 may be configured with knowledge of the HES 100, and in particular of one or more processors that are used in the HES 100. In embodiments, when the compiler 110 is so configured, the compiler 110 may generate the versions of executable code 113 and 115 to use instructions from the various ISAs of the processors used in the HES 100. For example, as illustrated in FIG. 1, in various embodiments the compiler 110 may compile a portion of the source code 105 into executable code for a CPU (113) as well as executable code for a GPU (115). In various embodiments, the source code 105 may comprise main line code and one or more functions; one or more of these functions may be compiled into the versions of executable code 113 and 115. In alternate embodiments, the different versions of the executable code may be compiled using different compilers, such as by software developers, with the compilers targeted for processors of different ISA.

The different versions of the executable code 113 and 115 may then be loaded by a loader 120, which may, in various embodiments, optionally be included in the HES 100 or may be a separate component or module. In various embodiments, the loader 120 may be configured to load the different versions of executable code 113 and 115 into physical memory 160. For example, as illustrated, the different versions of executable code 113 and 115 may be stored in physical memory at separate sets of physical memory addresses, such as the illustrated sets EC 1 physical addresses 170 and EC 2 physical addresses 180. In various embodiments, the loader 120 may also be configured to configure or to facilitate configuration of page tables (such as illustrated page tables 140 and 150) to support various virtual memory address translation activities described herein. Particular examples of activities performed by the loader 120 are described below.

In embodiments, the HES 100 may be configured with one or more processors such as first processor 130 and second processor 135 that are configured to execute executable code on the HES 100. As discussed above, in various embodiments, first processor 130 and second processor 135 may be configured to execute instructions based on different ISAs. Thus, in some embodiments, the first and second processors 130 and 135 may not be configured to execute code written for the other processor. In some embodiments, the processors may comprise a CPU and a GPU; in other embodiments, different processors be utilized. In various embodiments, more than two processors may be utilized as well.

In various embodiments, the first and second processors 130 and 135 may be configured to utilize virtual memory. In particular, in various embodiments, the first and second processors 130 and 135 may be associated with multiple page tables, such as page tables 140 and 150, in order for a virtual memory manager to translate virtual memory addresses to be accessed by the processors to physical memory addresses. In various embodiments, the multiple page tables 140 and 150 may be configured to translate one or more virtual memory addresses into distinct physical memory addresses that are associated with code-containing memory regions. Thus, as illustrated in FIG. 1, the page tables 140 and 150 may each contain information that executable code is to be nominally found at a specific set of virtual memory addresses (e.g., the set of virtual memory addresses illustrated as EC VM addresses 155). However, in various embodiments, the page tables 140 and 150 may each be configured to translate these virtual memory addresses to separate physical memory addresses of physical memory locations where the executable code are actually found. Thus, as illustrated in FIG. 1, the page tables 140 and 150 may be configured to translate the addresses out of the set of addresses of EC VM addresses 155 to either the sets of physical memory addresses EC 1 physical addresses 170 or EC 2 physical addresses 180, depending on the page table used for translation. As discussed above, the use of these multiple page tables by the HES 100 allows multiple versions of executable code to be selectively used by the HES 100, while still allowing for a single virtual memory address to be used to point to the code, as if there were only one version.

Figure 2:
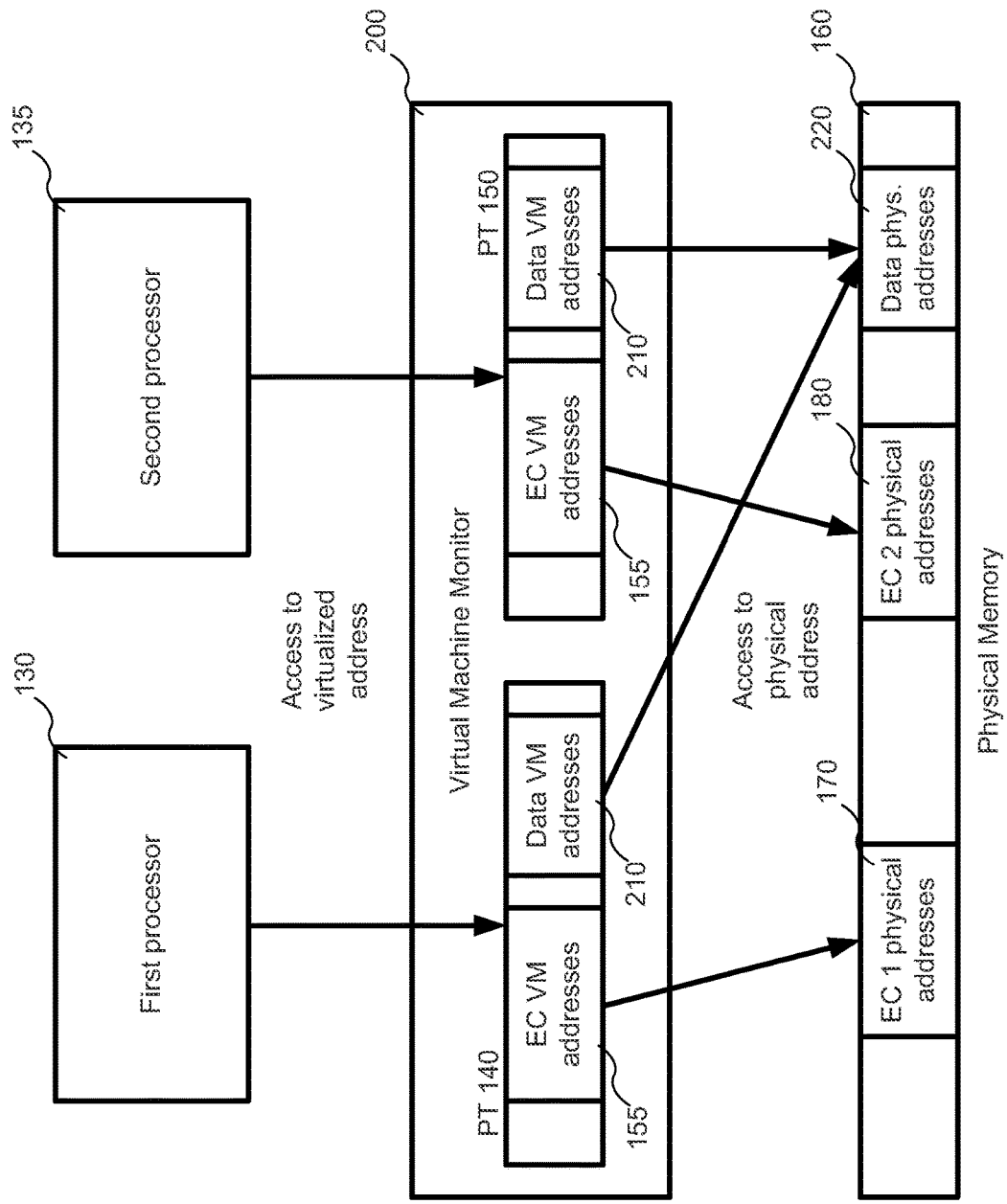
FIG. 2 illustrates an example virtual machine monitor of the heterogenous execution system with multiple page tables, in accordance with various embodiments.

FIG. 2 illustrates an example virtual machine monitor 200 ("VMM 220") of the HES 100, in accordance with various embodiments. In various embodiments, the VMM 200 may be configured to implement one or more operations of the HES 100 described herein. In various embodiments, the VMM 200 may be configured to translate memory accesses by the first and/or second processors 130 and 135. For example, the first processor 130 and/or second processor 135 may execute guest software in a virtual machine (not illustrated) that utilizes virtual memory. As part of operation of the guest software, the first processor 130 and/or the second processor 135 may seek to perform memory accesses at one or more virtual memory addresses. In some embodiments, these memory accesses may comprise code fetches and/or data accesses.

As illustrated in FIG. 2, the VMM 200 may include the page tables 140 and 150. In various embodiments, the page tables 140 and/or 150 may be configured to be associated with the first and second processors 130 and 135. In some embodiments, either of the page tables 140 and 150 may be associated with only a single processor; in other embodiments, either or both of the page tables 140 and 150 may be associated with multiple processors. In embodiments, if a page table is associated with multiple processors, those processors may be configured to operate according to the same ISA.

In embodiments, the page tables 140 and 150 may be configured to show a common set of virtual memory addresses as addressing the same executable code. Embodiments, of this common set of virtual memory addresses is demonstrated in Figure by the set of EC VM addresses 155 that is contained in the same location in each of page tables 140 and 150. In various embodiments, addresses in the EC VM addresses 155 may be mapped by each of the page tables 140 and 150 into separate sets of physical memory addresses, such as EC 1 physical addresses 170 and EC 2 physical addresses 180. As discussed above, in various embodiments, these sets of physical memory addresses may be determined by a loader 120 that is configured to store various versions of executable code into physical memory at different locations encompassed by EC 1 physical addresses 170 and EC 2 physical addresses 180.

As discussed above, in various embodiments, while the page tables 140 and 150 may be configured to map a set of common virtual memory addresses for executable code to separate physical memory addresses. Additionally, in various embodiments, the page tables 140 and 150 may be configured to map virtual memory addresses associated with data storage to a common set of physical memory addresses. Thus, as illustrated, the page tables 140 and 150 may be configured to map virtual memory addresses from a set of data virtual memory addresses 210 to a set of data physical memory addresses 220. In various embodiments, these data-associated virtual memory addresses may be associated with the same set of physical memory addresses by every one of the multiple page tables utilized by the HES 100. In embodiments, by utilizing page tables 140 and 150 that map data-associated virtual memory addresses to the same physical memory addresses, the VMM 200 of the HES 100 may allow the heterogenous first processor 130 and second processor 135 to have access to the same data while still facilitating the usage of function pointers, such as described above.

Figure 3:
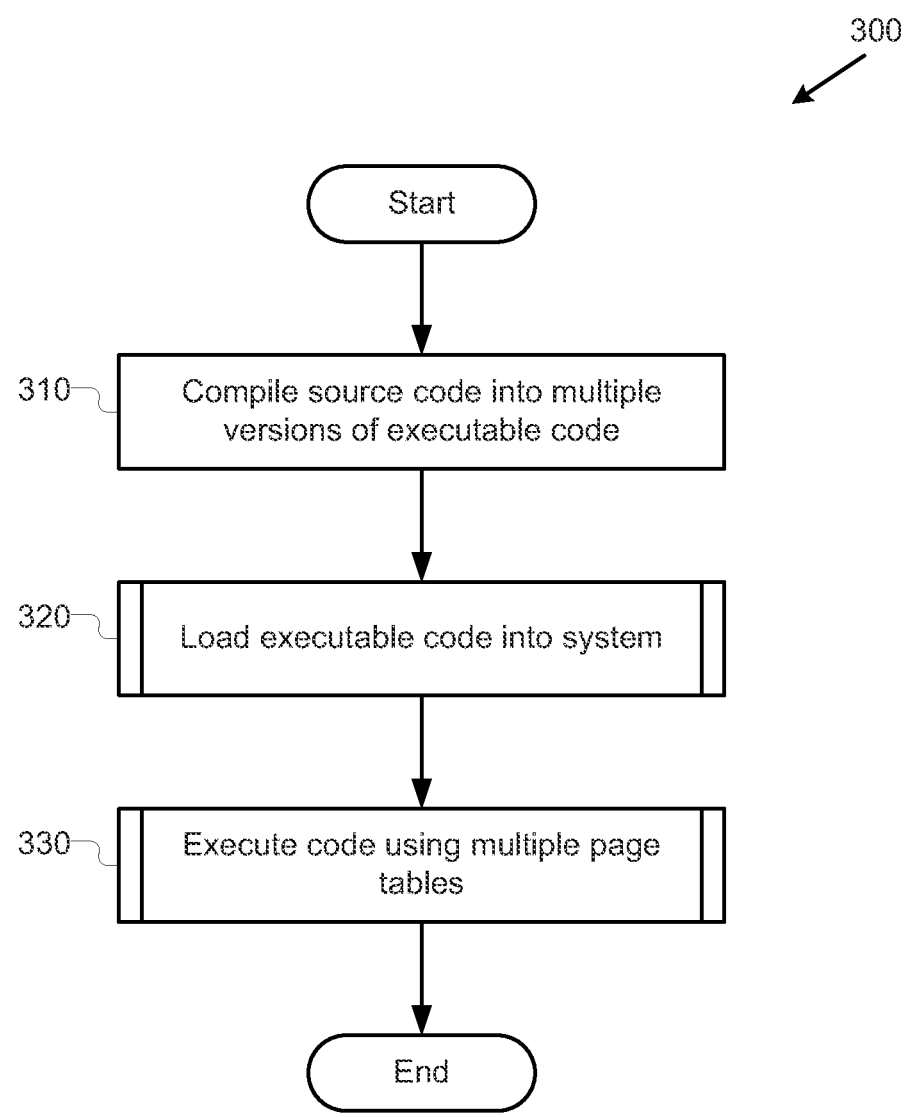
FIG. 3 illustrates an example heterogenous execution system with multiple page tables execution process, in accordance with various embodiments.

FIG. 3 illustrates an example HES 100 process 300, in accordance with various embodiments. In various embodiments, process 300 may be performed to compile, load, and execute executable code on the HES 100. The process may begin at operation 310, where the compiler 110 may compile a portion of source code 105 into multiple versions of executable code, such as versions of executable code 113 and 115. As discussed above, in various embodiments, each of the versions of executable code may contain instructions that are based on a different ISA, and thus may each be executable by a different processor in the HES 100. Next, at operation 320, the loader 120 may load the different versions of the executable code into the HES 100. Particular embodiments of this operation are discussed below with reference to process 400 of FIG. 4. Next, at operation 330, the HES 100 may selectively execute appropriate versions of the executable code using multiple page tables. In embodiments, operation 330 may include one or more code fetches using function pointers. Particular embodiments of these code fetches are discussed below with reference to process 500 of FIG. 5. The process may then end.

Figure 4:
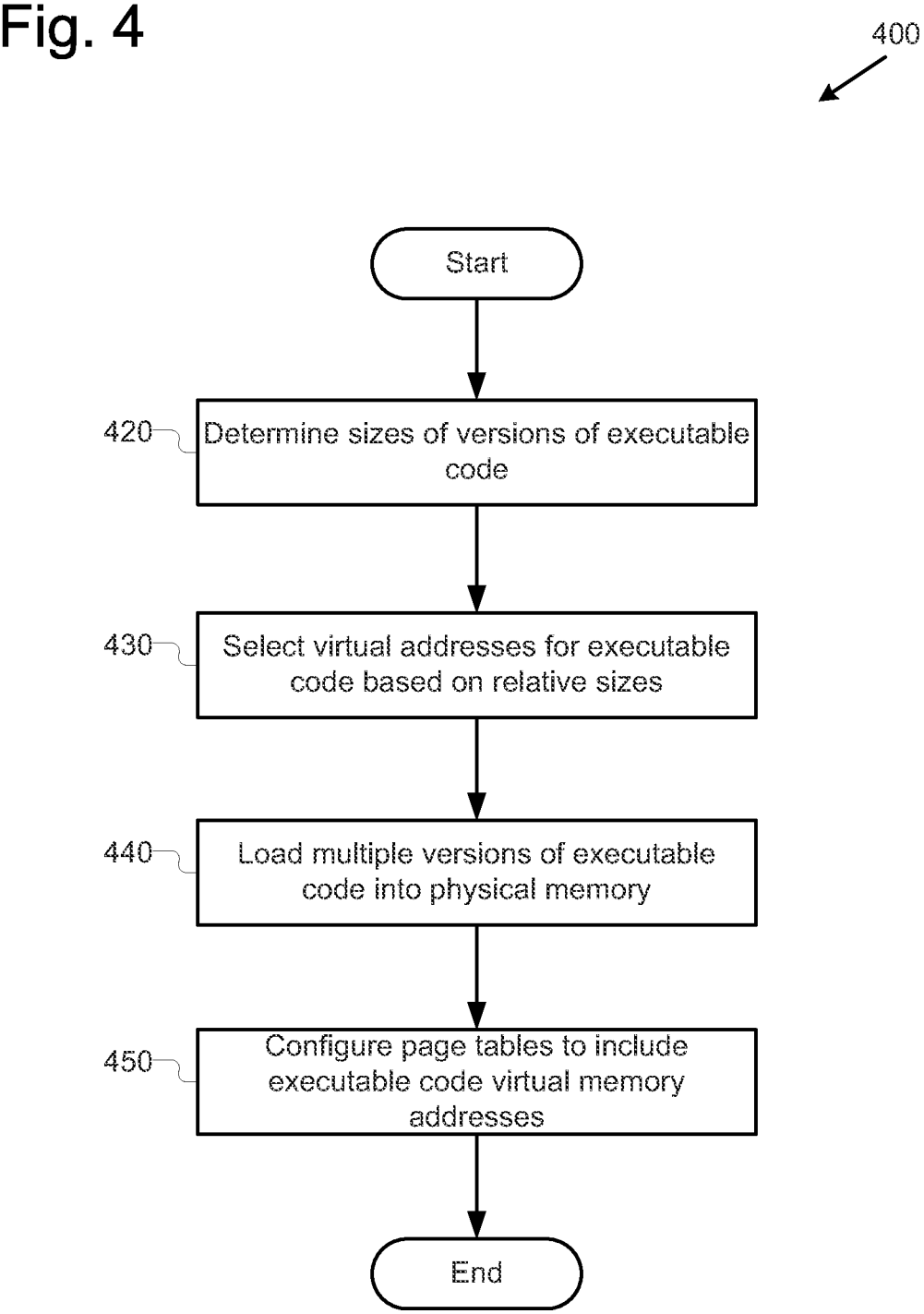
FIG. 4 illustrates an example heterogenous execution s system with multiple page tables loading process, in accordance with various embodiments.

FIG. 4 illustrates an example HES 100 process 400, in accordance with various embodiments. The process may begin at operation 420, where the loader 120 may determine sizes of the different versions of the executable code that were generated by the compiler 110. Then, at operation 430, the loader 120 may select virtual memory addresses to be mapped to the different versions of the executable code based on the sizes determined at operation 420. In various embodiments, the loader may be configured to select the largest size of the different versions of executable code as a size for the set of virtual memory addresses that will be mapped to the versions of the executable code. In embodiments, by selecting the largest size, the loader 120 may be configured such that the set of virtual memory addresses is at least as large as any one version of executable code stored in physical memory. Additionally, by selecting the largest size, the loader 120 may better provide for functions to be found consistently at the same virtual memory addresses by any processor, regardless of the size of a version of executable code used by that processor. In embodiments, the set of virtual memory addresses may therefore be padded, such as when compared to a smaller-sized version of executable code, to reach this selected.

Next, at operation 440, the loader 120 may be configured to toad multiple versions of executable code into physical memory. In various embodiments, the loader may load each version of executable code into memory at contiguous sets of physical memory addresses; in other embodiments, each version of executable code may be stored in separate discontiguous physical memory segments. In various embodiments, the loader 120 may be configured to load the various versions of executable code into equal-sized segments of the physical memory. In various embodiments, the loader 120 may be configured to load the various versions of executable code into segments of the physical memory equal in size to the size selected at operation 430. Thus, in some embodiments, the loader 120 may be configured to pad the physical memory taken up by a smaller version of executable code so that that version of executable code takes up the same amount of physical memory space as other versions. In other embodiments, the multiple versions of executable code may be stored in different-sized segments of memory, regardless of whether they are mapped-to by the same set of virtual memory addresses.

Next, at operation 450, the loader 120 may be configured to configure the page tables, such as page tables 140 and 150 to include the virtual memory addresses for the various versions of the executable code. In various embodiments, the loader may generate the page tables at operation 450. In other embodiments, the loader 120 may be configured to write the mapping between the virtual memory addresses and the physical memory addresses for the various versions of the executable code into already-created page tables. In yet other embodiments, the loader 120 may be configured to provide information on the mapping to the VMM 100 (or other entity) for creation or configuration of the page tables 140 and 150. The process may then end.

Figure 5:
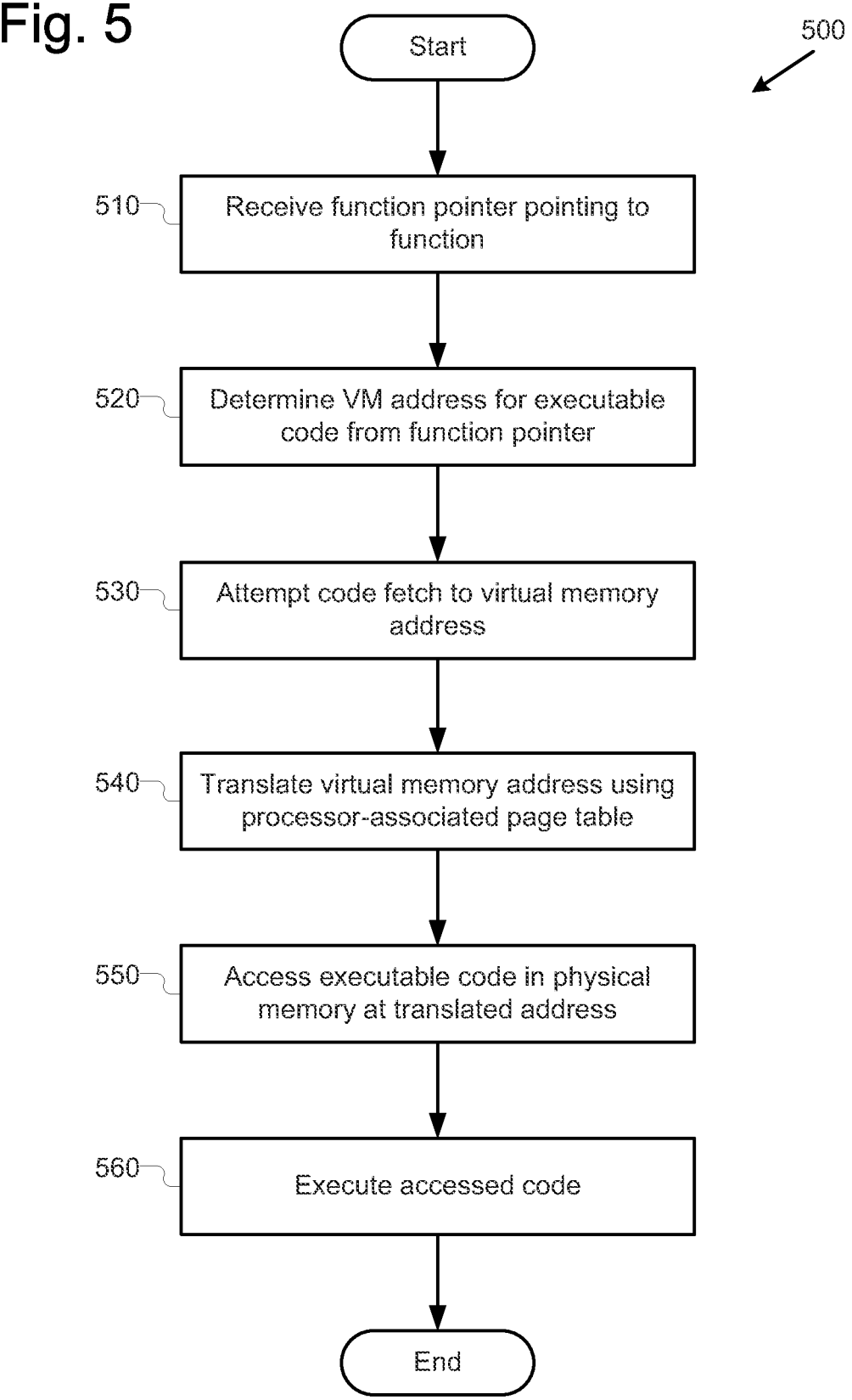
FIG. 5 illustrates an example heterogenous execution system with multiple page tables code fetch process, in accordance with various embodiments.

FIG. 5 illustrates an example HES 100 code fetch process 500, in accordance with various embodiments. In various embodiments, process 500 may he performed through execution of a process on a processor where a function pointer is passed to the process and the processor attempts to switch execution to a function pointed to by the function pointer. While process 500 is described with reference to a single processor, it may be recognized that, in various embodiments, the process may be repeated for a different processor in the HES 100 using the same function pointer.

The process may begin at operation 510, where the process executing on one of the processors of the HES 100 may receive the function pointer. In various embodiments, the function pointed to may he associated with the source code 105 and one of the versions of executable code 113 or 115 described above.

Next, at operation 520, the HES 100 may determine a virtual memory address from the function pointer that points to the executable code for the function. As discussed above, in various embodiments, the virtual memory address may be the same regardless of which processor the current process is executing on. Next, at operation 530, the processor may attempt a code fetch for the executable code pointed to by the function pointer (e.g., the executable code the processor expects to find at the virtual memory address determined at operation 520).

Next at operation 540, the VMM 200 may translate the virtual memory address using the page table associated with the processor (e.g. page table 140 or 150). Then, at operation 550, the processor may access executable code from physical memory that is found at the translated physical memory address, accessed code may then be executed by the processor at operation 560. The process may then end.

Figure 6:
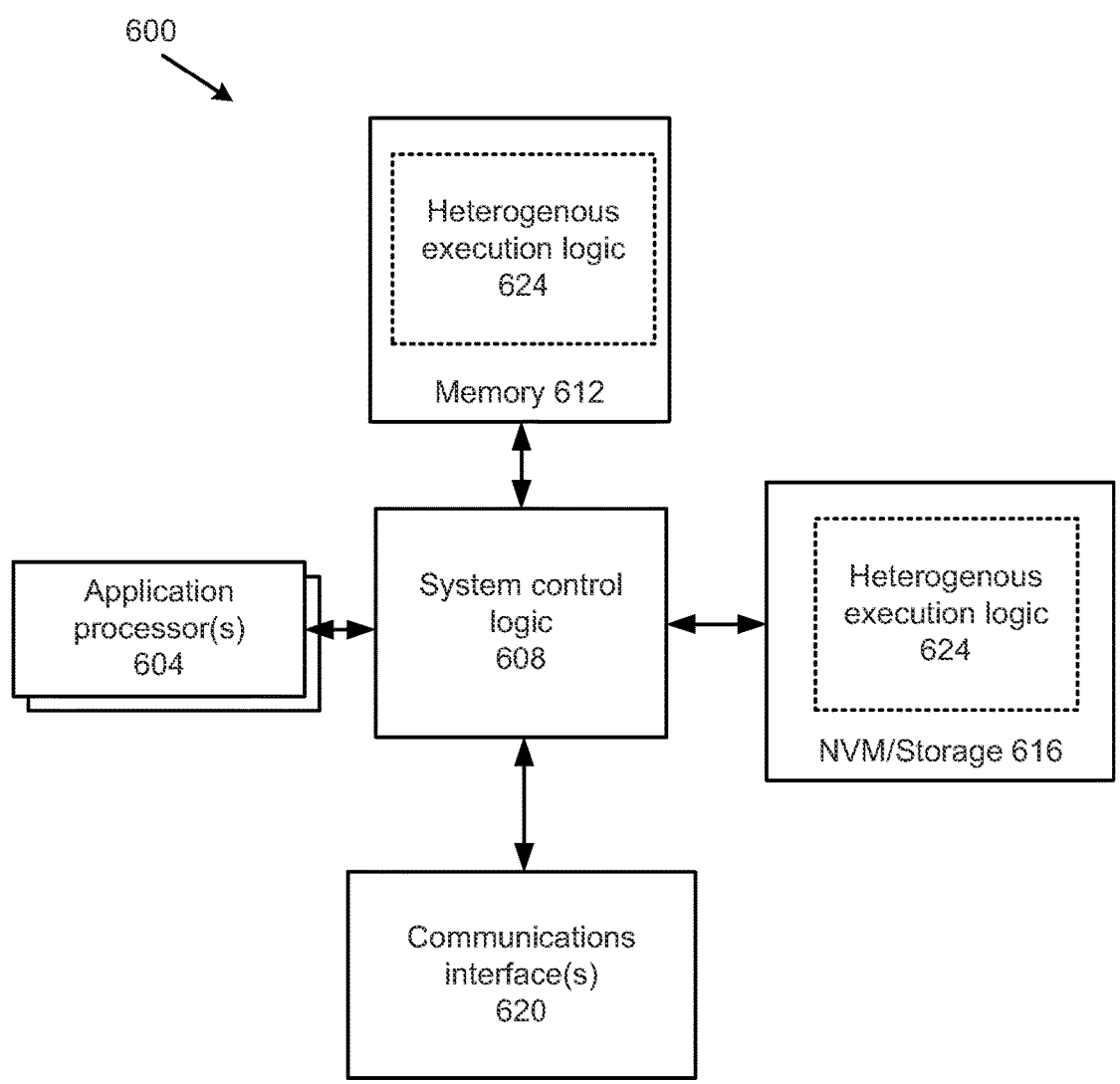
FIG. 6 illustrates an example computing environment suitable for practicing the disclosure, in accordance with various embodiments.

FIG. 6 illustrates, for one embodiment, an example computer system 600 suitable for practicing embodiments of the present disclosure. As illustrated, example computer system 600 may include control logic 608 coupled to at least one of the processor(s) 604, system memory 612 coupled to system control logic 608, non-volatile memory (NVM)/storage 616 coupled to system control logic 608, and one or more communications interface(s) 620 coupled to system control logic 608. In various embodiments, the one or more processors 604 may be a processor core.

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. In one embodiment, system memory 612 may include any suitable volatile memory, such as suitable dynamic random access memory ("DRAM"), for example.

System control logic 608, in one embodiment, may include one or more input/output ("I/O") controller(s) to provide an interface to NVM/storage 816 and communications interface(s) 620.

NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 616 may include a storage resource physically part of a device on which the system 600 is installed or it may be accessible by, hut not necessarily a part of, the device. For example, the NVM/storage 616 may be accessed over a network via the communications interface(s) 620.

System memory 612 and NVM/storage 616 may include, in particular, temporal and persistent copies of heterogenous execution logic 624. The heterogenous execution logic 624 may include instructions that when executed by at least one of the processor(s) 604 result in the system 600 practicing one or more of the heterogenous execution with multiple page table-related operations described above. In some embodiments, the heterogenous execution logic 624 may additionally/alternatively be located in the system control logic 608.

Communications interface(s) 620 may provide an interface for system 600 to communicate over one or more network(s) and/or with any other suitable device. Communications interface(s) 620 may include any suitable hardware and/or firmware, such as a network adapter, one or more antennas, a wireless interface, and so forth. In various embodiments, communication interface(s) 620 may include an interface for system 600 to use NFC, optical communications (e.g., barcodes), BlueTooth or other similar technologies to communicate directly (e.g., without an intermediary) with another device.

For one embodiment, at least one of the processor(s) 604 may be packaged together with system control logic 608 and/or heterogenous execution logic 624. For one embodiment, a least one of the processor(s) 604 may be packaged together with system control logic 608 and/or heterogenous logic 624 to form a System in Package ("SiP"). For one embodiment, at least one of the processor(s) 804 may be integrated on the same die with system control logic 608 and/or heterogenous execution logic 624. For one embodiment, at least one of the processor(s) 604 may be integrated on the same die with system control logic 608 and/or heterogenous execution logic 624 to form a System on Chip ("SoC").

The following paragraphs describe examples of various embodiments. In various embodiments, a heterogenous computing apparatus for executing a function on the heterogenous computing apparatus may include a physical memory. The apparatus may also include a first computer processor coupled to the physical memory and configured to support a first instruction set architecture. The apparatus may also include a second computer processor coupled to the physical memory and configured to support a second instruction set architecture. The apparatus may also include a virtual machine manager configured to operate on one or more computer processors of the apparatus to translate virtual memory addresses to physical memory addresses. The virtual memory manager may be configured to operate to translate a virtual memory address associated with a code fetch by the first or the second computer processor into a corresponding physical memory address of the physical memory, using a selected one of a first page table or a second page table, wherein which of the first or the second page table is used depends on whether the virtual memory address is associated with the code fetch by the first or the second computer processor.

In various embodiments, the first page table may be configured to map the virtual memory address to a first physical memory address, and the second page table may be configured to map the virtual memory address to a second physical memory address that is different from the first physical memory address. In various embodiments, the physical memory may be configured to contain first executable code for the function in a first physical memory region that includes the first physical memory address and second executable code for the function in a second physical memory region that includes the second physical memory address, and the first and second physical memory regions may be different physical memory regions. In various embodiments, the first and second instruction set architectures may be distinct. In various embodiments, the first executable code may include instructions of the first instruction set architecture and the second executable code may include instructions of the second instruction set architecture.

In various embodiments, the apparatus may further include a loader configured to operate on one or more computer processors of the apparatus. The loader may be configured to load the first executable code into the first physical memory region and to load the second executable code into the second physical memory region. In various embodiments, the loader may be further configured to operate to facilitate configuration the first and second page tables to map the virtual memory address associated with the code fetch to the corresponding first and second physical memory addresses.

In various embodiments, the virtual memory address may be associated with the code fetch based on a function pointer comprising the virtual memory address, the function pointer being available to both the first computer processor and the second computer processor. In various embodiments, the virtual memory address may be passed as an argument to both executable code executing on the first computer processor and executable code executing on the second computer processor.

In various embodiments, a computer-implemented method may facilitate execution of code on a heterogenous computing device comprising a first computer processor utilizing a first instruction set and a second computer processor utilizing a second instruction set. The method may include loading, by a loader operating on the computing device, first executable code for the function based on the first instruction set and second executable code for the function based on the second instruction set into physical memory of the computing device at respective first and second physical memory regions, the loading performed in response to a request to load executable code for a function into memory on the computing device, the executable code comprising first executable code and second executable code for the function based on the second instruction set. The method may also include facilitating, by the loader, configuration of first and second page tables for use in translating virtual memory accesses made by the corresponding first and second computer processors, the first and second page tables mapping a virtual memory address for a code fetch to the function to physical addresses in the corresponding first and second physical memory regions.

In various embodiments, the method may further include facilitating configuration, by the loader, of the first and second page tables to map virtual memory addresses associated with a common virtual memory region including the virtual memory address for the code fetch to physical memory addresses of the first and second physical memory regions.

In various embodiments, the method may further include selecting, by the loader, a size for the common virtual memory region based on respective sizes of the first executable code and the second executable code. In various embodiments, selecting the size may include selecting the common size based at least in part on a larger of a size of the first executable code and a size of the second executable code.

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable storage media comprising instructions embodied therein that, in response to execution by a computer device having a first computer processor with a first instruction set architecture and a second computer processor with a second instruction set architecture that differs from the first instruction set architecture, cause the computer device to operate a virtual machine manager to facilitate selective invocation of a first version of a function for execution by the first computer processor or a second version of the same function for execution by the second computer processor, wherein to facilitate, the virtual machine manager is to translate a virtual memory address in a function pointer of the function associated with a code fetch by the first or the second processor into corresponding first or second physical memory address of a first or a second physical memory location of a first or a second physical memory region having the first or the second version of the same function respectively implemented with first and second plurality of instructions of the first or second instruction set architecture, wherein to translate the virtual memory address, the virtual machine manager is to use a selected one of a first page table or a second page table correspondingly associated with the first and second processors, wherein which of the first and second page tables is used depends on whether the code fetch is associated with the first or the second processor.

2. The one or more computer-readable storage media of claim 1, wherein:
the first page table maps the virtual memory address in the function pointer of the function associated with the code fetch to the first physical memory address, when the code fetch is associated with the first processor, and
the second page table maps the virtual memory address in the function pointer of the function associated with the code fetch to the second physical memory address, when the code fetch is associated with the second processor.

3. The one or more computer-readable storage media of claim 2, wherein the first physical memory address is associated with the first physical memory location of the first physical memory region having the first version of the function implemented with instructions of the first instruction set architecture of the first processor, and the second physical memory address is associated with the second physical memory location of the second physical memory region having the second version of the function implemented with instructions of the second instruction set architecture of the second processor, wherein the first and second physical memory regions are different physical memory regions.

4. The one or more computer-readable storage media of claim 3, wherein the first and second page tables are to map virtual memory addresses associated with a common virtual memory data region to physical memory addresses of a common physical memory region.

5. The one or more computer-readable storage media of claim 3, wherein the first version of the function implemented with instructions of the first instruction set architecture, and the second version of the function implemented with instructions of the second instruction set architecture are each generated from common source code.

6. The one or more computer-readable storage media of claim 5, wherein the instructions are to further cause the computer device to operate a loader to load the first version of the function and the second version of the function into the corresponding first and second physical memory regions.

7. The one or more computer-readable storage media of claim 6, wherein the loader is to facilitate configuration of the first and second page tables to map the virtual memory address of the function point of the function associated with the code fetch to the corresponding first and second physical memory addresses.

8. The one or more computer-readable storage media of claim 7, wherein the loader is to facilitate configuration of the first and second page tables to map virtual memory addresses associated with a common virtual memory region including the virtual memory address associated with the code fetch to physical memory addresses of the first and second physical memory regions.

9. The one or more computer-readable storage media of claim 8, wherein the loader is to select a size for the common virtual memory region based at least in part on respective sizes of the first version of the function and the second version of the function.

10. The one or more computer-readable storage media of claim 9, wherein the loader is to select the size for the common virtual memory region based at least in part on a larger of a size of the first version of the function and a size of the second version of the function.

11. One or more non-transitory computer-readable storage media comprising instructions embodied therein that, in response to execution by a computer device comprising a first computer processor with a first instruction set architecture and a second computer processor with a second instruction set architecture that differs from the first instruction set architecture, cause the computer device to operate a loader to facilitate selective invocation of either a first version a function or a second version of the same function for execution by either the first computer processor or the second computer processor, wherein to facilitate, the loader is to:
respond to a request to load executable code for the function into memory on the computer device, wherein the executable code of the first version of the function is implemented with a first plurality of instructions of the first instruction set architecture, and the executable code of the second version of the same function is implemented with a second plurality of instructions of the second instruction set architecture, wherein response to the request includes performance of a load of the executable code of the first version of the function, and the executable code of the second version of the same function into physical memory of the computer device at respective first and second physical memory regions;
facilitate configuration of first and second page tables for use in translating a virtual memory address in a function pointer of the function associated with a code fetch made by the corresponding first and second computer processors, wherein the first and second page tables are to respectively map the virtual memory address in the function pointer to first and second physical memory addresses in the corresponding first and second physical memory regions respectively having the executable code of the first and second versions of the same function.

12. The one or more computer-readable storage media of claim 11, wherein the loader is to facilitate configuration of the first and second page tables through facilitation of configuration of the first and second page tables to respectively map virtual memory addresses associated with a common virtual memory region, including the virtual memory address in the function pointer of the function, to physical memory addresses of the first and second physical memory regions.

13. The one or more computer-readable storage media of claim 12, wherein the loader is to select a size for the common virtual memory region based on respective sizes of the first version of the executable code and the second version of the executable code.

14. The one or more computer-readable storage media of claim 13, wherein the loader is to select the size based at least in part on a larger of a size of the first version of the executable code and a size of the second version of the executable code.

15. A heterogenous computer apparatus for executing a function on the heterogenous computer apparatus comprising:
a physical memory;
a first computer processor coupled to the physical memory and to support a first instruction set architecture;
a second computer processor coupled to the physical memory and to support a second instruction set architecture; and
a virtual machine manager to operate on one or more computer processors of the apparatus to facilitate selective invocation of a first version of a function or a second version of the same function for respective execution by either the first computer processor or the second computer processor;
wherein to facilitate, the virtual machine manager is to translate virtual memory addresses to physical memory addresses;
wherein the virtual machine manager is to operate to translate a virtual memory address in a function pointer of the function associated with a code fetch by the first or the second computer processor into corresponding first or second physical memory address of a first or a second memory region of the physical memory having a first or a second version of the same function respectively implemented with first and second plurality of instructions of the first or second instruction set architecture, using a selected one of a first page table or a second page table; and
wherein which of the first or the second page table is used depends on whether the virtual memory address in the function pointer is associated with a code fetch by the first or the second computer processor.

16. The apparatus of claim 15, wherein:
the first page table is to map the virtual memory address in the function pointer to a first physical memory address, when the code fetch is associated with the first processor; and
the second page table is to map the virtual memory address in the function pointer to a second physical memory address, when the code fetch is associated with the second processor.

17. The apparatus of claims 16, further comprising a loader to operate on one or more computer processors of the apparatus to load the function into the physical memory, wherein to load the function into the physical memory, the loader is to:
load executable code of the first version of the function into the first physical memory region; and
load executable code of the second version of the same function into the second physical memory region.

18. The apparatus of claim 17, wherein the loader is further to operate to facilitate configuration of the first and second page tables to respectively map the virtual memory address in the function pointer associated with a code fetch to the corresponding first and second physical memory addresses of the first and second physical memory regions.

19. A computer-implemented method for facilitating selective execution of a first version of a function or a second version of the same function on a heterogenous computer device comprising first and second computer processors with first and second different instruction set architectures, the method comprising:

translating, by a virtual machine manager operating on the computer device, a virtual memory address in a function pointer of the function associated with a code fetch by the first or the second processor into a corresponding first or second physical memory address of a first or a second physical memory location of a first or a second physical memory region respectively having a first version of the function implemented with a first plurality of instructions of the first instruction set architecture or a second version of the same function implemented with a second plurality of instructions of the second instruction set architecture, wherein to translate the virtual memory address, the virtual machine manager is to use a selected one of a first page table or a second page table correspondingly associated with the first and second processors, wherein which of the first or second page table is used depends on whether the virtual memory address in the function pointer is associated with the code fetch by the first or the second processor.

20. The method of claim 19, wherein:

the first page table maps the virtual memory address in the function pointer to the first physical memory address, when the code fetch is associated with the first processor, and the second page table maps the virtual memory address to the second physical memory address when the code fetch is associated with the second processor.

21. A computer-implemented method for facilitating selective execution of a first version of a function or a second version of a function on a heterogenous computer device comprising a first computer processor with a first instruction set architecture and a second computer processor with a second instruction set architecture, the method comprising:

in response to a request to load the function into physical memory of the computer device, loading, by a loader operating on the computer device, executable code of a first version of the function implemented with first plurality of instructions of the first instruction set architecture and executable code of a second version of the same function implemented with second plurality of instructions of the second instruction set architecture into the physical memory of the computer device at respective first and second physical memory regions;

facilitating, by the loader, configuration of first and second page tables for use in translating a virtual memory accesses in a function pointer of the function associated with a code fetch made by the corresponding first and second computer processors, the first and second page tables respectively mapping the virtual memory address in the function pointer to a first physical address or a second physical address in the corresponding first and second physical memory regions respectively having the first and second versions of the executable code of the function.

22. The method of claim 21, further comprising facilitating configuration, by the loader, of the first and second page tables to respectively map virtual memory addresses associated with a common virtual memory region, including the virtual memory address in the function pointer, to physical memory addresses of the first and second physical memory regions.

* * * * *

UNITED STATES PATENT AND TRADEMARK OFFICE
CERTIFICATE OF CORRECTION

PATENT NO. : 9,697,120 B2  
APPLICATION NO. : 13/997642  
DATED : July 4, 2017  
INVENTOR(S) : Mike B. Macpherson Page 1 of 1

It is certified that error appears in the above-identified patent and that said Letters Patent is hereby corrected as shown below:

In the Specification

Column 11  
Line 24, "…first version a…"" should read – …first version of a… –

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*